E. C. MORGAN.
Corn-Sheller.
No. 165,750. Patented July 20, 1875.
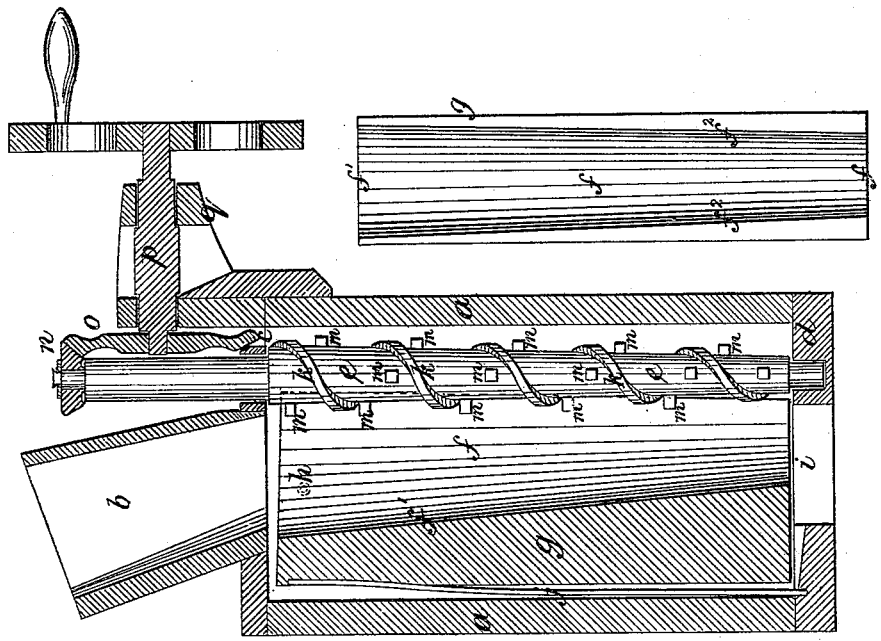
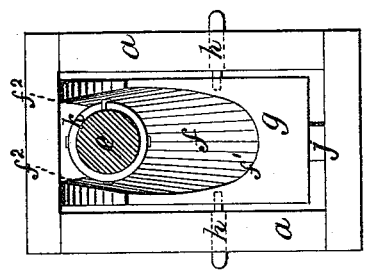
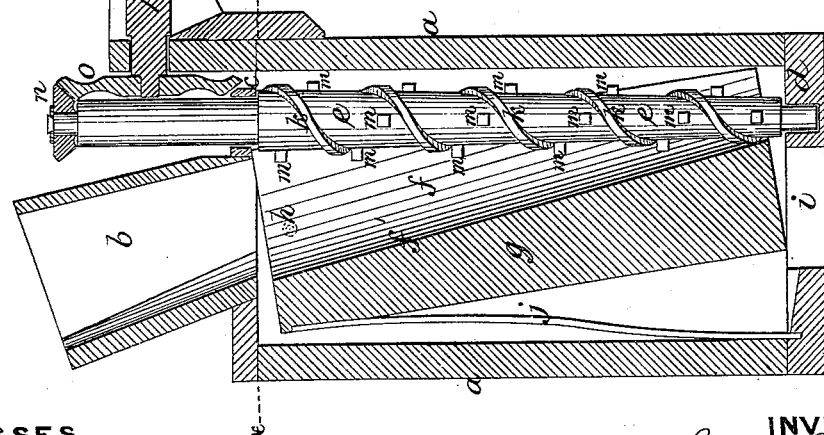
WITNESSES
John E. Laing
J. H. Rutherford
INVENTOR
Elijah C. Morgan
By Johnson and Johnson
his Attys.

UNITED STATES PATENT OFFICE.

ELIJAH C. MORGAN, OF VALDOSTA, GEORGIA.

IMPROVEMENT IN CORN-SHELLERS.

Specification forming part of Letters Patent No. 165,750, dated July 20, 1875; application filed December 3, 1874.

*To all whom it may concern:*

Be it known that I, ELIJAH C. MORGAN, of Valdosta, in the county of Lowndes and State of Georgia, have invented certain new and useful Improvements in Corn-Shellers; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention consists in the combination, with a revolving tapering screw-pin, of a pivoted yielding breast or conduit, arranged to embrace and close with the opposite sides of the screw-pin, so that the latter will revolve within the trough while said trough swings over the pin to open the discharge for the cob; also, in the combination, with the revolving tapering screw-pin, of the pivoted yielding breast or conduit, formed with downwardly-tapering sides and back, whereby the gutter for the ear of corn, with its compound taper toward the bottom, forms a small discharge for the cob.

In the accompanying drawings, Figure 1 represents a vertical section of a corn-sheller embracing my invention, showing the suspended open trough in the position it occupies to receive an ear of corn; Fig. 2, a similar section, showing the suspended open trough in the position it occupies in discharging the shelled cob, and Fig. 3 a horizontal section taken at the line $x\ x$ of Fig. 1.

The frame consists of a vertical oblong square box, $a$, of suitable length, surmounted by a hopper, $b$, and open at the bottom. Within this box, near one of its narrowest sides, is mounted, in suitable bearings $c\ d$, a cast-iron shelling screw-pin, $e$, and in front thereof, and within the box-space, is arranged an open breast or trough, $f$, to receive the ears of corn, and it is formed in a solid piece of timber or cast-iron, $g$, as being the simplest and cheapest manner of construction, and suspended by pivots $h$ near its upper end, so that its trough-space $f$, being open at both ends and at one side, shall partially inclose the vertical shelling screw-pin, and have a vibratory movement toward and therefrom under the shelling action. The upper open trough end is directly below the hopper, and the lower open trough end opens into the bottom opening $i$ of the inclosing-box, so that the ears of corn being received from the hopper pass through the trough $f$, and the cob is discharged therefrom through the bottom opening. The shelling screw-pin $e$ and the suspended trough are of equal length, and the latter is provided at its closed side or back with a spring, $j$, which constantly tends to press the lower end of the trough toward the shelling screw-pin $e$, so that the normal position of the suspended trough is inclined to the screw-pin, and fully embraces the lower portion of the latter, as shown in Fig. 1. The shelling screw-pin $e$ tapers toward its lower end, and is provided with a spiral thread, $k$, of square cross-section, with wide spaces intervening between the threads, studded with square spur-teeth $m$, which, in conjunction with the screw-threads $k$, serve, by the revolution of the screw-pin, to revolve and strip the ears of corn, the angles of the screw-thread and of the studs stripping the grains, under the pressure of the trough, as the ears descend. The peculiarity in the construction of this breast or trough $f$ consists in its having a compound tapering trough-space—that is to say, it has a taper toward the screw from its closed side $f^1$, as shown in Fig. 1, and a taper toward the screw at its open sides $f^2$, as shown in Fig. 3, forming thereby a wide mouth sufficient to receive the ear, and a comparatively narrow outlet for the discharge of the cob, and within which compound tapering trough-space the tapering shelling screw-pin stands, so as to close up the open sides $f^2$ of the trough-space, whereby a yielding shelling-conduit is formed, having a double taper for co-operative action with a revolving tapering pin armed with a screw-thread of angular section, alternating with the square studs, operating to effect the stripping with the least fracture of the kernels.

As the ear of corn descends the conduit the trough turns upon its pivots $h$ with a slight vibrating movement, and gradually moves back from the revolving screw-pin, whose motion is effected by a small bevel-gear, $n$, on its upper end, into which a larger bevel-wheel, $o$, matches on the end of a balance crank-wheel shaft, $p$, mounted in a suitable frame, $q$, upon the box.

The shelling device is intended to be mounted upon a suitable receiver for the shelled corn.

I claim—

1. The combination, with a revolving tapering screw-pin, $e$, of a pivoted yielding breast or conduit, $f$, arranged to embrace and close with the opposite sides of the screw-pin, whereby the latter will revolve within the trough, while said trough swings over the pin, substantially as and for the purpose herein set forth.

2. The combination, with the revolving tapering screw-pin $e$, of the pivoted yielding breast or conduit $f$, formed with downwardly-tapering sides $f^2 f^2$ and back $f^1$, as and for the purpose described.

In testimony that I claim the foregoing as my own, I have affixed my signature in presence of two witnesses.

ELIJAH C. MORGAN.

Witnesses:
 A. H. SMITH,
 A. J. BESSENT.